US012141427B2

(12) United States Patent
Okada et al.

(10) Patent No.: US 12,141,427 B2
(45) Date of Patent: Nov. 12, 2024

(54) INFORMATION PROCESSING DEVICE

(71) Applicant: SONY INTERACTIVE ENTERTAINMENT INC., Tokyo (JP)

(72) Inventors: Michihiro Okada, Kanagawa (JP); Akimitsu Yasuda, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 17/287,631

(22) PCT Filed: Nov. 5, 2019

(86) PCT No.: PCT/JP2019/043318
§ 371 (c)(1),
(2) Date: Apr. 22, 2021

(87) PCT Pub. No.: WO2020/095906
PCT Pub. Date: May 14, 2020

(65) Prior Publication Data
US 2021/0349622 A1   Nov. 11, 2021

(30) Foreign Application Priority Data
Nov. 9, 2018   (JP) ................. 2018-211509

(51) Int. Cl.
*G06F 3/04847*   (2022.01)
*G06F 3/04817*   (2022.01)
*G06F 3/04842*   (2022.01)

(52) U.S. Cl.
CPC ...... *G06F 3/04847* (2013.01); *G06F 3/04817* (2013.01); *G06F 3/04842* (2013.01)

(58) Field of Classification Search
CPC .. G06F 3/048; G06F 3/04847; G06F 3/04817; G06F 3/04842;
(Continued)

(56) References Cited

U.S. PATENT DOCUMENTS 8,811,499 B2 *   8/2014   Moote ............ H04N 21/440263
                                                    375/240
9,830,061 B1 *   11/2017  Wheeler ............. G06F 3/04842
(Continued)

FOREIGN PATENT DOCUMENTS

JP   2008-263457 A   10/2008
JP   2010-92246 A    4/2010
(Continued)

OTHER PUBLICATIONS

Matejka, Justin, Tovi Grossman, and George Fitzmaurice. "Swifter: improved online video scrubbing." Proceedings of the SIGCHI Conference on Human Factors in Computing Systems. 2013. (Year: 2013).*

(Continued)

*Primary Examiner* — Liang Y Li
(74) *Attorney, Agent, or Firm* — XSENSUS LLP (57) ABSTRACT

Provided is an information processing device that, while displaying an image, displays a moving image of interest different from the image in a predetermined region inside a display region in which the image is being displayed, and, according to an instruction by a user, arrays and displays, inside the display region, an image string including a plurality of frame images extracted from the moving image of interest, and that displays the image string at a position determined according to the predetermined region inside the display region.

20 Claims, 9 Drawing Sheets

(58) Field of Classification Search
CPC .... G06F 3/0488–04886; G06F 3/0485–04855; G09G 5/14; G11B 27/031–038; H04N 5/272–275; G06Q 10/101
See application file for complete search history.

(56) References Cited

U.S. PATENT DOCUMENTS

| | | | | |
|---|---|---|---|---|
| 10,225,602 | B1* | 3/2019 | Sirpal | H04N 21/482 |
| 2009/0058822 | A1* | 3/2009 | Chaudhri | G06F 3/14 |
| | | | | 345/173 |
| 2010/0281371 | A1* | 11/2010 | Warner | G11B 27/34 |
| | | | | 715/723 |
| 2013/0307792 | A1* | 11/2013 | Andres | G06F 3/04847 |
| | | | | 345/173 |
| 2014/0029915 | A1* | 1/2014 | Lin | G06F 16/745 |
| | | | | 386/241 |
| 2014/0258854 | A1* | 9/2014 | Li | H04N 21/414 |
| | | | | 715/702 |
| 2014/0310601 | A1* | 10/2014 | Matejka | H04N 21/8153 |
| | | | | 715/720 |
| 2015/0095839 | A1* | 4/2015 | Hombert | G06F 16/74 |
| | | | | 715/781 |
| 2015/0310896 | A1* | 10/2015 | Bredow | G11B 27/031 |
| | | | | 386/230 |
| 2015/0346984 | A1 | 12/2015 | Flint et al. | |
| 2018/0012075 | A1* | 1/2018 | Okada | G11B 27/34 |
| 2019/0306561 | A1* | 10/2019 | Xu | G06F 3/0488 |

FOREIGN PATENT DOCUMENTS

| | | |
|---|---|---|
| JP | 2012-54829 A | 3/2012 |
| JP | 2012054829 A | 3/2012 |
| JP | 2014-96786 A | 5/2014 |
| JP | 2016-220186 A | 12/2016 |
| JP | WO2016125339 A1 * | 6/2017 |
| JP | 2018-511843 A | 4/2018 |

OTHER PUBLICATIONS

Matejka, Justin, Tovi Grossman, and George Fitzmaurice. "Swift: reducing the effects of latency in online video scrubbing." Proceedings of the SIGCHI Conference on Human Factors in Computing Systems. 2012. (Year: 2012).*

Merriam Webster. "String". Feb. 8, 2019. <https://web.archive.org/web/20190208001604/https://www.merriam-webster.com/dictionary/string> (Year: 2019).*

International Preliminary Report on Patentability issued May 11, 2021, from PCT/JP2019/043318, 15 sheets.

International Search Report and Written Opinion mailed Jan. 21, 2020, from PCT/JP2019/043318, 11 sheets.

Notice of Reasons for Refusal dated Jan. 25, 2022, from Japanese Patent Application No. 2020-556084, 4 sheets.

* cited by examiner

INFORMATION PROCESSING DEVICE

TECHNICAL FIELD

The present invention relates to an information processing device, an information processing method, and a program that overlay and display a moving image on a different image.

BACKGROUND ART

While an image of some kind (hereinafter referred to a whole image) is being displayed inside a screen and the image is being browsed, simultaneously browsing a different moving image is sometimes desired. For the purpose of enabling execution of such simultaneous browsing using a limited display region, there exists an information processing device that allows the different moving image to be displayed inside a small region that occupies part of a region in which the whole image is being displayed. Such an information processing device makes it possible to, while displaying the whole image in a wide region, simultaneously display the moving image, even though part of the whole image is hidden by the moving image.

SUMMARY

Technical Problem

In the above conventional technology example, a situation sometimes occurs in which a user desires to reproduce another portion of the moving image being reproduced. A user interface for such a situation has not yet been sufficiently considered.

The present invention has been made in view of the above actual situations, and one of the objects of the present invention is to provide an information processing device, an information processing method, and a program that are capable of, in a case in which a moving image is overlaid and displayed on a different image, providing an interface suitable for changing, by a user, the reproducing position of the moving image.

Solution to Problem

An information processing device according to the present invention includes a moving image display control section that, while displaying an image, displays a moving image of interest different from the image in a predetermined region inside a display region in which the image is being displayed, and an image string display control section that, according to an instruction by a user, arrays and displays, inside the display region, an image string including a plurality of frame images extracted from the moving image of interest, and the image string display control section displays the image string at a position determined according to the predetermined region inside the display region.

An information processing method according to the present invention includes a moving image display control step of, while an image is being displayed, displaying a moving image of interest different from the image in a predetermined region inside a display region in which the image is being displayed, and an image string display control step of, according to an instruction by a user, arraying and displaying, inside the display region, an image string including a plurality of frame images extracted from the moving image of interest, and in the image string display control step, the image string is displayed at a position determined according to the predetermined region inside the display region.

A program according to the present invention is a program which causes a computer to execute a moving image display control step of, while an image is being displayed, displaying a moving image of interest different from the image in a predetermined region inside a display region in which the image is being displayed, and an image string display control step of, according to an instruction by a user, arraying and displaying, inside the display region, an image string including a plurality of frame images extracted from the moving image of interest, and, in the image string display control step, the image string is displayed at a position determined according to the predetermined region inside the display region. The program may be provided in the form of being stored in a computer-readable non-transitory information storage medium.

DESCRIPTION OF EMBODIMENT

Hereinafter, an embodiment of the present invention will be described in detail on the basis of the drawings.

Figure 1:
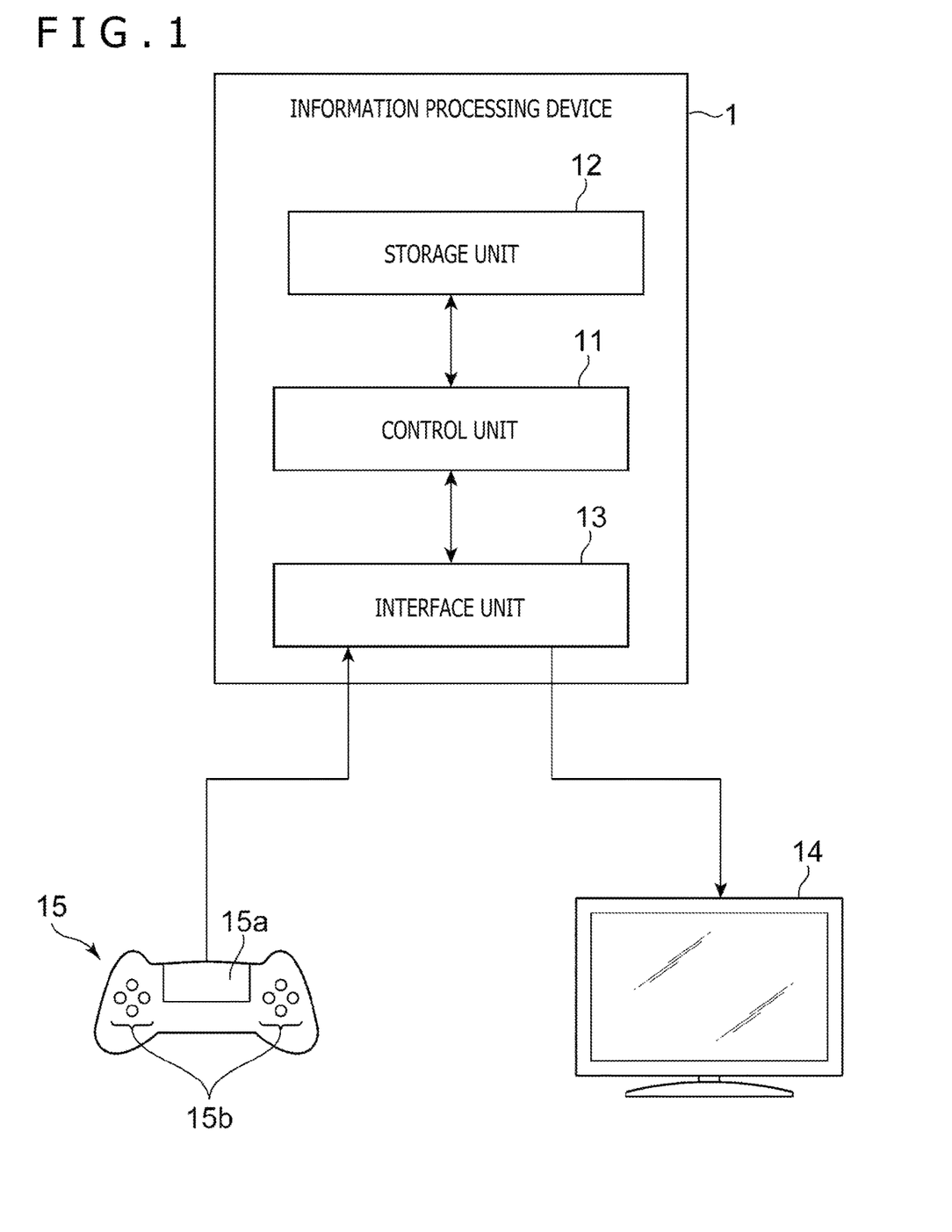
FIG. 1 is a configuration block diagram illustrating a configuration of an information processing device according to an embodiment of the present invention.

FIG. 1 is a configuration block diagram illustrating a configuration of an image processing device 1 according to an embodiment of the present invention. The information processing device 1 is, for example, a portable game machine, a home game machine, a personal computer, a smartphone, a video player, or the like, and includes, as illustrated in FIG. 1, a control unit 11, a storage unit 12, and an interface unit 13. Further, the information processing device 1 is coupled to a display unit 14 and an operation device 15.

The control unit 11 includes at least one processor such as a central processing unit (CPU), and performs various kinds of information processing by executing a program stored in the storage unit 12. Note that specific examples of the processing performed by the control unit 11 in the present embodiment will be described later. The storage unit 12 includes at least one memory device such as a random access memory (RAM), and stores the program executed by the control unit 11 and data processed by the program.

The interface unit 13 is an interface for data communication with the display unit 14 and the operation device 15. The information processing device 1 is connected to each of the display unit 14 and the operation device 15 via the interface unit 13 by using a wired or wireless link. Specifically, in order to transmit video data supplied by the information processing device 1 to the display unit 14, the interface unit 13 is particularly configured include a multimedia interface such as a high-definition multimedia interface (HDMI) (registered trademark). Further, the interface unit 13 includes a data communication interface such as a universal Serial Bus (USB) in order to receive a signal indicating the content of an operation that a user has performed onto the operation device 15.

The display unit 14 is a liquid crystal display, an organic electroluminescent (EL) display, or the like, and displays an image according to a video signal supplied from the information processing device 1. The operation device 15 is, for example, a keyboard and a mouse device, a controller for a home game machine, or the like, and receives operation inputs from the user. Here, the display unit 14 and the operation device 15 may both be incorporated inside the housing of the information processing device 1, or may be separate devices each connected to the information processing device 1 via a wired or wireless link. The operation device 15 may be a set of a touch panel and push buttons that is arranged on the surface of the housing of the information processing device 1. In the following, as a specific example, an assumption is made that the operation device 15 is a controller for a home game machine, and includes a set of a touch pad 15a and buttons 15b that is arranged on the surface of the housing of the operation device 15. Here, the touch pad 15a outputs information regarding a position with which a finger of the user has been brought into contact, and the buttons 15b are used for the executions of various operation inputs. The touch pad 15a may be configured to be capable of receiving push-in operations onto the entire surface of the touch pad 15a.

Figure 2:
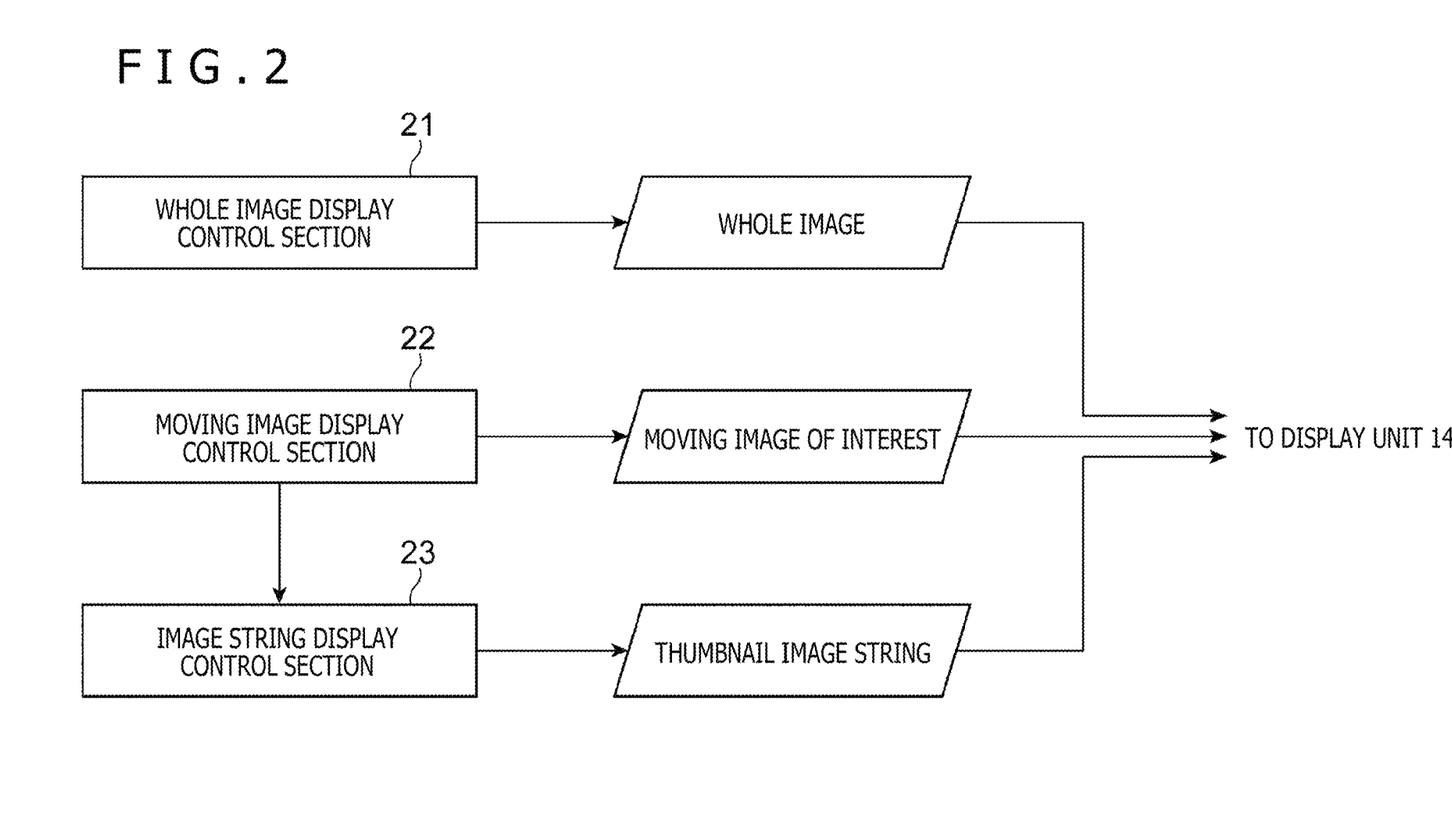
FIG. 2 is a function block diagram illustrating functions of the information processing device according to the embodiment of the present invention.

Hereinafter, functions implemented by the information processing device 1 will be described using FIG. 2. As illustrated in FIG. 2, the information processing device 1 functionally includes a whole image display control section 21, a moving image display control section 22, an image string display control section 23. These functions are implemented by allowing the control unit 11 to operate according to the program stored in the storage unit 12. The program may be provided via a communication network such as the Internet, or may be provided in the form of being stored in a computer-readable information storage medium such as an optical disk.

The whole image display control section 21 performs control of displaying a whole image inside the screen of the display unit 14. Here, the whole image may be, for example, a game image for a game being reproduced by a user, and may be a moving image different from a moving image of interest described later. Further, the whole image may be any other kind of image. In the case where the whole image is the game image, it follows that the whole image display control section 21 is implemented by a game program. Further, in the case where the whole image is a moving image such as a movie, the whole image display control section 21 may be implemented by a video player program or the like. In the following, an intra-screen region in which the whole image is displayed will be referred to as a main display region M. The main display region M may be the whole or part of an intra-screen region with respect to which the display unit 14 is capable of displaying.

The moving image display control section 22 performs control of, in a state in which a whole image is being displayed in the main display region M, displaying and reproducing a moving image of interest at a position overlaid on the whole image. In the following, a region in which the moving image of interest is displayed will be referred to as a subdisplay region S. The subdisplay region S is a region having a rectangular shape smaller than that of the main display region M, and the entire subdisplay region S is included in the main display region M. The moving image display control section 22 displays the moving image of interest in a size that allows the entire moving image of interest to be fit into the subdisplay region S. Here, it follows that a partial whole image on which the subdisplay region is overlaid is hidden by the moving image of interest and is not displayed. Thus, the size of the subdisplay region S is preferred to be sufficiently small as compared with that of the main display region M. Each of the sides of the subdisplay region S is to be configured to be at minimum smaller than or equal to half of a corresponding one of the sides of the main display region M.

The moving image of interest may be a moving image that is read from an external storage medium, such as an optical disk, hard disk, or the like, and is reproduced, or may be a moving image delivered via a communication network such as the Internet. Further, the moving image of interest may be a broadcast program or the like that is delivered via radio waves or the like. Arranging, by the moving image display control section 22, the subdisplay region S at a position overlaid on the main display region M and reproducing the moving image of interest inside the subdisplay region S makes it possible for a user to, while browsing the whole image displayed in a large size, simultaneously also browse the moving image of interest.

The moving image of interest may be an associated moving image associated with content being displayed as the whole image. For example, in the case where a moving image of some kind is being displayed and reproduced as the whole image in the main display region M, the moving image of interest may be a moving image associated with the moving image being reproduced as the whole image. Specifically, the moving image display control section 22 displays, inside the subdisplay region S, an associated moving image associated with a moving image currently being reproduced inside the main display region M, as the moving image of interest, at timing specified by a user, timing when the end of reproducing of the moving image currently being reproduced inside the main display region M has approached, or any other timing. Here, the associated moving image may be selected from among candidate moving images, according to, for example, similarity degrees among the titles of the individual moving images, pieces of tag information set to the individual moving images, or the like. The candidate moving images may be moving images stored in an external storage medium coupled to the information processing device 1, or may be moving images that are published through a communication network such as the Internet. Further, in the case where the whole image display control section 21 executes a game program and a game screen is being displayed as the whole image, the moving image display control section 22 may select an associated moving image from among candidate moving images that are published as moving images associated with the game.

Figure 3:
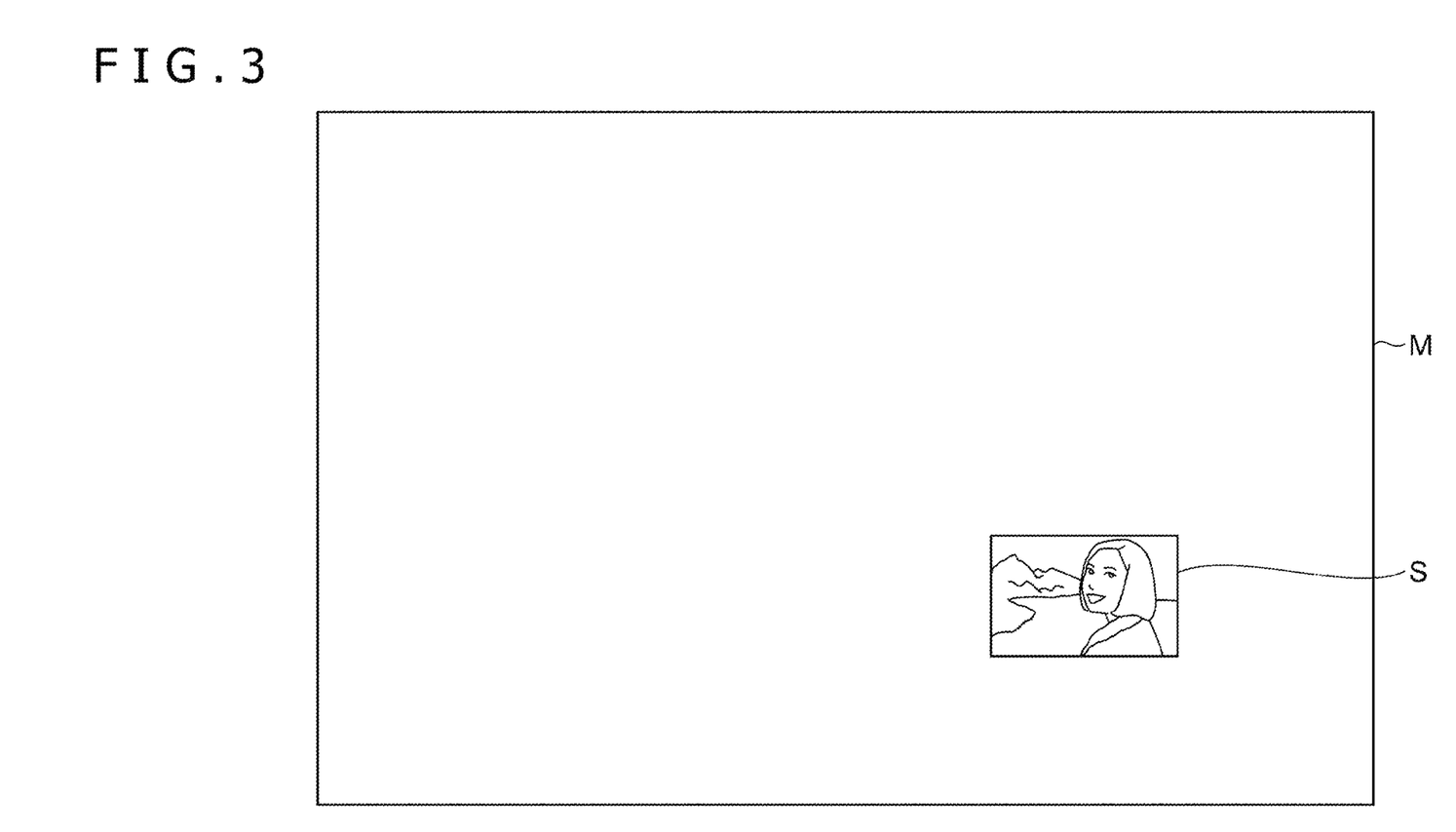
FIG. 3 is a diagram illustrating a display example of a moving image of interest.

FIG. 3 illustrates an arrangement example of the subdisplay region S. In this example of FIG. 3, the subdisplay region S is arranged at a lower right position of the main display region M, and a moving image of interest is reproduced inside the subdisplay region S. The position of the subdisplay region S inside the main display region M may be a predetermined position, or may be a position having been specified by a user. In the latter case, the user is able to, according to the content of the whole image being displayed in the main display region M, and any other condition, arrange the subdisplay region S at a position that is unlikely to lie in the way of the browsing of the whole image and that makes it easy for the user to view the content of the subdisplay region S. The configuration may be made such that, while a moving image of interest is being displayed, the user changes the display position of the moving image of interest through an operation of a direction-specification key provided on the operation device 15, or any other similar operation. Further, the configuration may be made such that the user specifies the position of the subdisplay region S in advance prior to starting the display of the moving image of interest.

Figure 4:
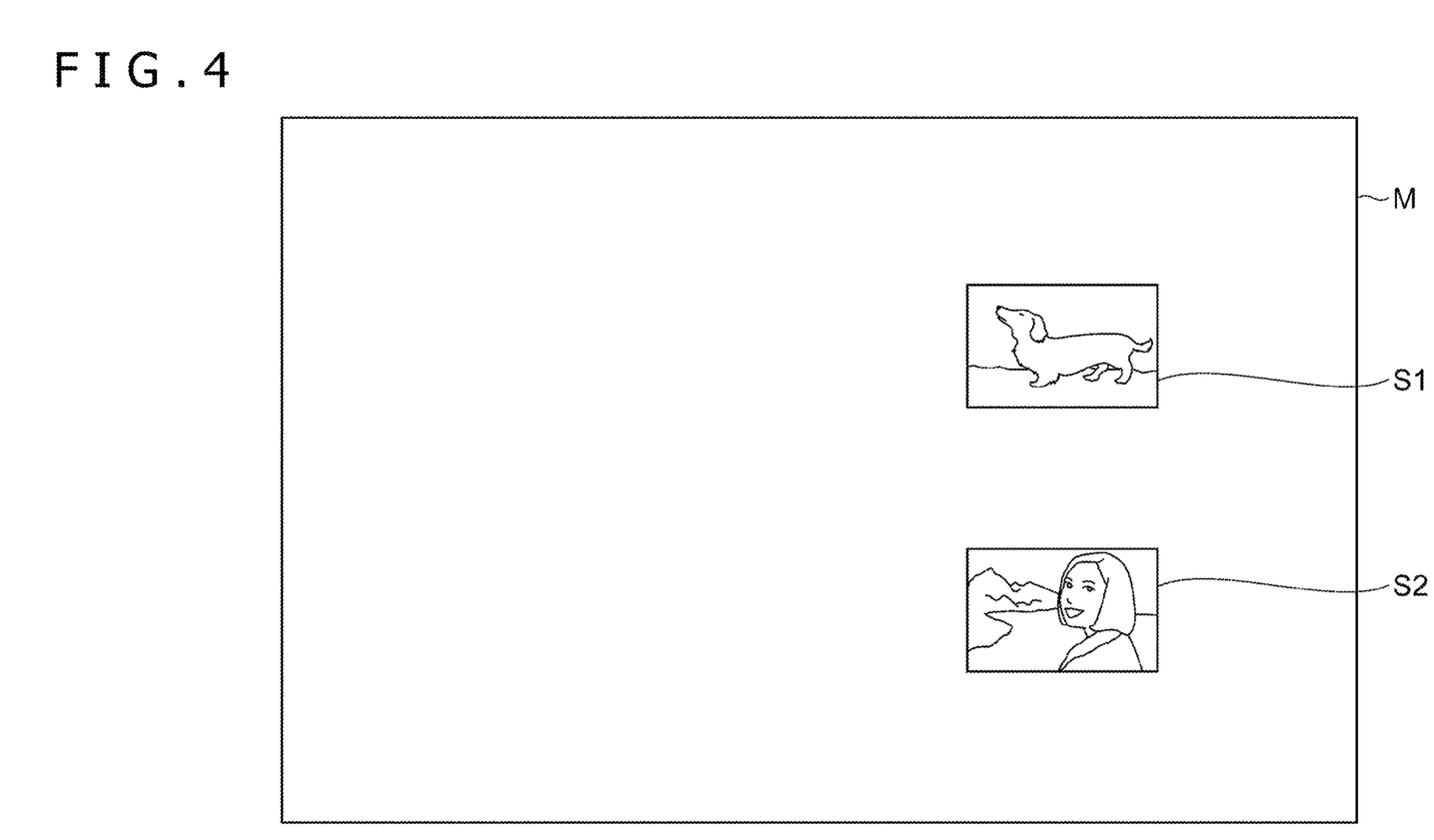
FIG. 4 is a diagram illustrating a display example of a plurality of moving images of interest.

The moving image display control section 22 may display a plurality of moving images of interest inside the main display region M at the same time. FIG. 4 is a diagram illustrating an arrangement example of the subdisplay regions S in this case. In this example of FIG. 4, a whole image is displayed in the entire main display region M, and a subdisplay region S1 and a subdisplay region S2 are respectively arranged at an upper right position of the main display region M and a lower right position of the main display region M. Further, a moving image of interest 1 is reproduced in the subdisplay region S1, and a moving image of interest 2 different from the moving image of interest 1 is reproduced in the subdisplay region S2. This configuration makes it possible for a user to, while browsing the whole image, simultaneously browse the conditions of the moving images of interest 1 and 2 being reproduced. Here, three or more subdisplay regions S may be arranged in the main display region M and three or more moving images of interest may be displayed at the same time. In particular, in the case where, as described above, an associated moving image associated with content being displayed in the main display region M is displayed as a moving image of interest, the moving image display control section 22 may select a plural number of such associated moving images and may display them at the same time.

The image string display control section 23 performs control of displaying, inside the main display region M, an image string including a plurality of frame images having been extracted from a moving image of interest. For example, at the time of reproducing a moving image of interest, the image string display control section 23 extracts a plurality of frame images to be sequentially displayed at predetermined time intervals or the like, and converts the extracted frame images into thumbnail images each having a display size. Further, according to an instruction by a user, the image string display control section 23 arrays and displays, inside the main display region M, an image string including the thumbnail images having been extracted in such a way as described above (the image string being hereinafter referred to as a thumbnail image string). At this time, the display size of each of the thumbnail images may be a size approximately the same as or smaller than the display size of the moving image of interest. Displaying such a thumbnail image string enables a user to overview the content of the moving image of interest in time series. Hereinafter, a region inside the display region M, in which one or thumbnail image strings are displayed will be referred to as a thumbnail display region T.

In the present embodiment, the image string display control section 23 is particularly configured to display the thumbnail image string according to an instruction having been input onto the operation device 15 by a user. The thumbnail image string may be displayed while the moving image of interest is being displayed inside the subdisplay region S, or may be displayed in a state in which the reproducing of the moving image of interest is halted. Note that, here, the configuration is made such that, in the case where the display of a thumbnail image string is instructed while a moving image of interest is being reproduced, the reproducing of the moving image of interest is brought to a halt. When displaying the thumbnail image string in such a state in which the reproducing of the moving image of interest is halted, the image string display control section 23 displays the thumbnail image string in which its center is placed on the reproducing position at the time of the halt, and displayed frame images are aligned before and after the center. This configuration makes it possible for the user to, by browsing the thumbnail image string, confirm the content of a portion of the moving image of interest, which has been reproduced so far, and the content of a portion of the moving image of interest, which is to be reproduced from now. Further, the configuration is made such that, when displaying a thumbnail image string in a state in which the reproducing of a moving image of interest is not started, the image string display control section 23 displays the thumbnail image string in which extracted frame images are aligned sequentially from the beginning of the moving image of interest.

In the present embodiment, the image string display control section 23 determines the position of the thumbnail display region T in the main display region M, according to the position of the subdisplay region S. For the thumbnail image string as well, like the moving image of interest, displaying the thumbnail image string at a fixed position inside the main display region M sometimes makes it difficult to brows the whole image. Thus, the image string display control section 23 determines the position of the thumbnail image string according to the position of the subdisplay region S, and thereby makes it possible to display the thumbnail image string in a form that makes it easy for the user to understand the content of the thumbnail image string and that makes the thumbnail image string unlikely to lie in the way of the browsing of the whole image.

Hereinafter, specific examples of the display control of the thumbnail image string will be described.

Figure 5:
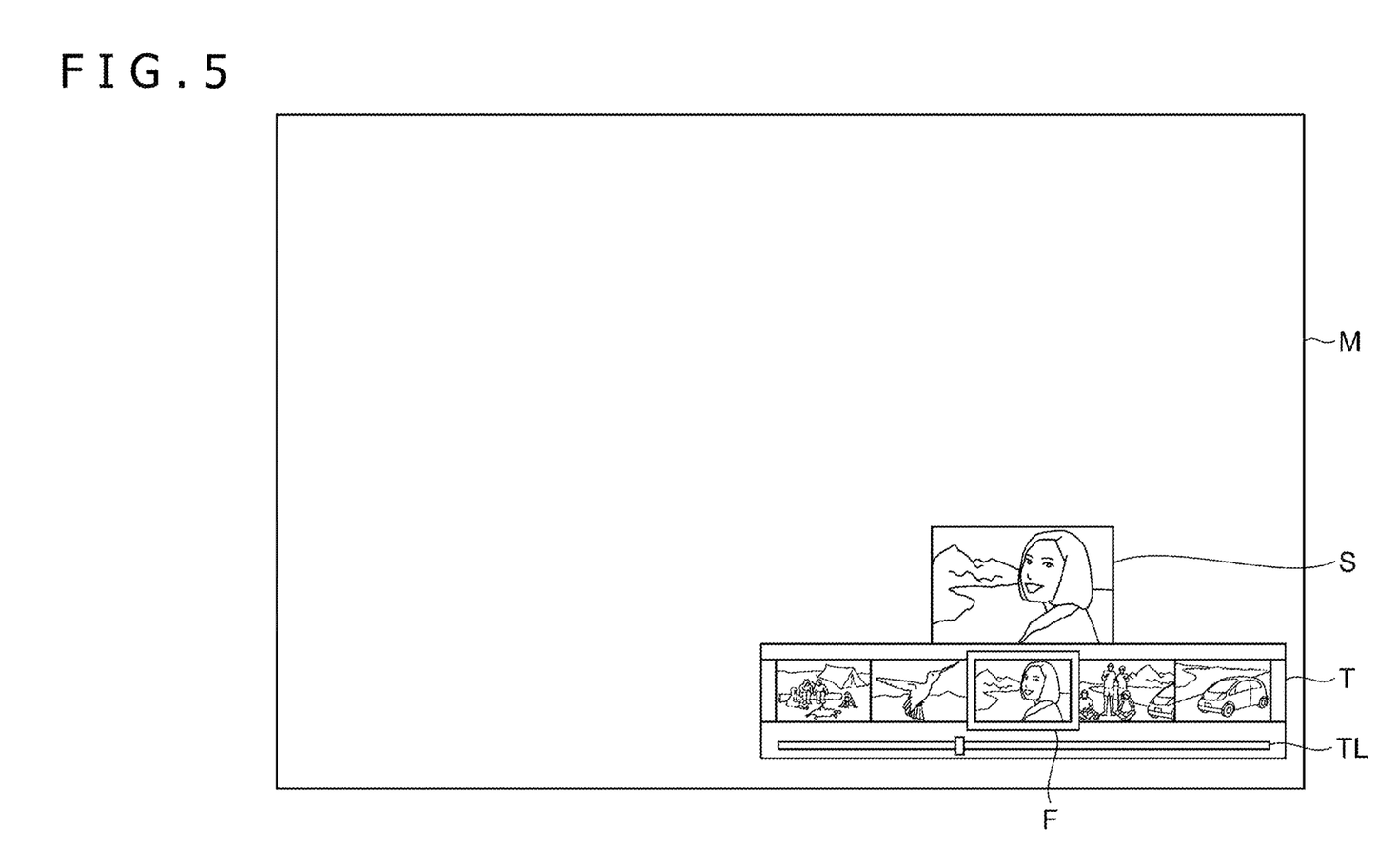
FIG. 5 is a diagram illustrating an example in which a thumbnail image string is displayed inside a region adjacent to a subdisplay region.

As a first example, an example in which a thumbnail image string is displayed in a thumbnail display region T adjacent to a subdisplay region S will be described. FIG. 5 is a display example in this case, and illustrates a display example of a case in which the display of a thumbnail image string has been instructed in a state in which a moving image of interest is displayed in the subdisplay region S having been illustrated as an example in FIG. 3. In this example of FIG. 5, the thumbnail image string includes a plurality of thumbnail images aligned and arranged in a lateral direction. Further, the thumbnail display region T in this example is arranged so as to be adjacent to a portion below the subdisplay region S having been arranged at a lower right position inside the main display region M. That is, the thumbnail image string is arranged adjacent to a position located further toward the periphery of the main display region M than the subdisplay region S. Arranging the thumbnail image string at a position closer to the periphery of the main display region M than the subdisplay region S in this way makes it possible for the thumbnail image string not to hide the vicinity of the center of the whole image. Note that although, here, a configuration in which individual frame images constituting the thumbnail image string are aligned and arranged in the lateral direction has been employed, another configuration in which the individual frame images are aligned and arranged in a vertical direction may be employed. In this configuration, similarly, arranging the thumbnail image string at a position close to the periphery of the main display region M makes it possible to make the display of the thumbnail image string unlikely to interfere with the browsing of the whole image.

Note that the width of the thumbnail display region T, which extend along a direction in which the thumbnail images are aligned (in FIG. 5, the direction being the lateral direction), may have a predetermined size or may be a width that coincides with the width of the entire main display region M, but is at minimum necessary to be a width beyond the width of the subdisplay region S, which extends along the same direction as that of the width of the thumbnail display region T. Further, the lateral-direction position of the thumbnail display region T is to be configured to be such a position that at minimum overlaps with the subdisplay region S.

In the case where the display of the thumbnail image string has been started in a state in which the reproducing of the moving image of interest is halted, a thumbnail image corresponding to the reproducing position at the time of the halt is arranged at a predetermined reference position inside the thumbnail display region T. This reference position may be a center position of thumbnail images in a direction in which the thumbnail images are aligned. Further, the reference position may be a position adjacent to the subdisplay region S. In the example of FIG. 5, with respect to a thumbnail image displayed at the reference position, a frame line image F surrounding the periphery of the thumbnail image is displayed. In this way, the thumbnail image located at the reference position is displayed in a form identifiable from any other thumbnail image. Setting the reference position to the center position of the thumbnail display region T makes it possible to display, inside the thumbnail display region T, thumbnail images corresponding to further past time points than the time point of the thumbnail image located at the reference position and thumbnail images corresponding to further future time points than the time point of the thumbnail image located at the reference position such that the number of the former thumbnail images is the same as the number of the latter thumbnail images.

Moreover, while a thumbnail image string is being displayed, a user may perform an operation of selecting any one of thumbnail images of the thumbnail image string. Specifically, since, here, the thumbnail images are aligned along the lateral direction, the user performs, along this alignment direction, an operation of specifying a left direction or a right direction. In response to this operation, the image string display control section 23 scrolls the thumbnail images being displayed inside the thumbnail display region T to sequentially switch a thumbnail image displayed at the reference position. Here, it follows that, in conjunction with the scroll, thumbnail images that have not been displayed so far in the thumbnail display region T are sequentially displayed. This configuration makes it possible to, across the entire period from the start time point of the reproducing of the moving image of interest until the end time point thereof, display, inside the thumbnail display region T, thumbnail images corresponding to frame images to be displayed at intermediate time points during the period. The user performs an input operation of instructing the selection completion in a state in which a target thumbnail image has been displayed at the reference position.

When the user instructs the selection completion for the thumbnail images, the image string display control section 23 terminates the display of the thumbnail image string, and the moving image display control section 22 resumes the reproducing of the moving image of interest from a reproducing position corresponding to a thumbnail image having been selected by the user (that is, from timing at which a frame image corresponding to the selected thumbnail image is displayed). This configuration makes it possible for the user to reproduce the moving image of interest from a desired reproducing position by shifting forward/backward the reproducing position of the moving image of interest. In addition, according to the content of an operation by the user, instead of starting the reproducing of the moving image of interest in the subdisplay region S, the moving image of interest may be displayed in the main display region M as the whole image. This configuration makes it possible for the user to allow the moving image of interest having been displayed so far in the subdisplay region S to be displayed in the main display region M in a larger size, and to allow the reproducing of the moving image of interest to start from a position specified by the user.

Further, in the example of FIG. 5, a time line bar TL is arrayed and displayed along the thumbnail image string in the thumbnail display region T. The time line bar TL corresponds to reproducing positions during the reproducing period of time of the entire moving image of interest, and a reproducing position being among the reproducing positions and corresponding to a thumbnail image string currently being displayed inside the thumbnail display region T is displayed in a highlighted manner. This configuration makes it possible for the user to recognize which time zone of the reproducing time of period of the entire moving image of interest the thumbnail image string being displayed inside the thumbnail display region T corresponds to.

Figure 6:
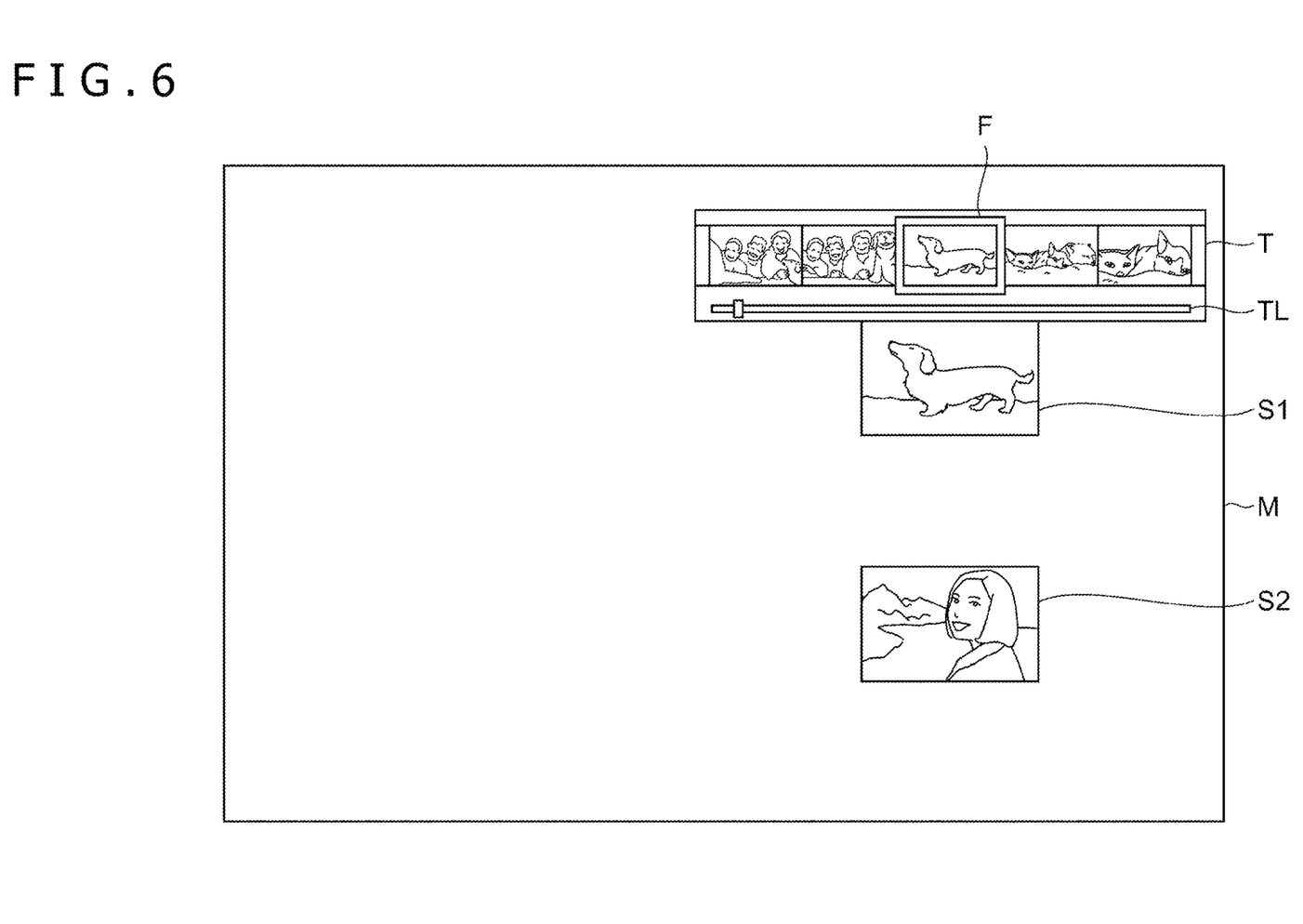
FIG. 6 is a diagram illustrating another example in which a thumbnail image string is displayed inside a region adjacent to a subdisplay region.

FIG. 6 illustrates an example of a case in which, in a state in which, just like the example illustrated in FIG. 4, a plurality of subdisplay regions S are arranged, a thumbnail image string is displayed so as to be adjacent to one of the subdisplay regions S. In the example of FIG. 4, the plurality of subdisplay regions S are arrayed and arranged along the vertical direction. In this case, the image string display control section 23 may select a moving image of interest targeted for the display of a thumbnail image string, according to an instruction of specifying an upper direction or a lower direction from a user.

As a specific example, in the case where the user has input an operation of specifying the upper direction onto the operation device 15 subsequent to an operation of calling the function of displaying a thumbnail image string, the image string display control section 23 displays a thumbnail image string including frame images having been extracted from a moving image of interest 1 being displayed at the upper side. At this time, as illustrated in FIG. 6, the image string display control section 23 displays the thumbnail image string at a position adjacent to the upper side of the subdisplay region S1. The display position of the thumbnail image string in this case is a position at the outer peripheral side as viewed from the subdisplay region S1, and is also a position opposite the subdisplay region S2 as viewed from the subdisplay region S1. Displaying the thumbnail image string at such a position makes it possible to facilitate to recognize which of the plurality of moving images of interest the thumbnail image string corresponds to, as compared with a case in which the thumbnail image string is displayed at the lower side of the subdisplay region S1 (i.e., at the side of the subdisplay region S2). In contrast, in the case where an operation of specifying the lower direction has been input, the image string display control section 23 displays a thumbnail image string including frame images having been extracted from a moving image of interest 2 being displayed at the lower side. The display position of the thumbnail image string in this case may be a position adjacent to the lower side of the subdisplay region S2, just like the example of FIG. 5.

Further, the user may use the touch pad 15a to select a moving image of interest targeted for the display of the thumbnail image string from among the plurality of moving images of interest. Specifically, the user can select any one of the plurality of moving images of interest by performing an operation of touching a position located inside the touch pad 15a and corresponding to a position at which a moving image of interest targeted for the selection is being displayed inside the main display region M. In the example of FIG. 6, touching a portion inside an upper right region falling within a detection range of the touch pad 15a and touching a portion inside a lower right region falling within the detection range of the touch pad 15a respectively make it possible to select the moving image of interest 1 and the moving image of interest 2. In this way, the user can intuitively select the moving image of interest. Here, in the case where the user has performed a slide operation in the left or right direction using the touch pad 15a in a state in which a thumbnail image string corresponding to a selected moving image of interest is displayed, the thumbnail image string may be scrolled according to the left direction or the right direction in which the slide operation has been performed. Moreover, the selection of a thumbnail image being displayed at the reference position may be received by means of a push-in operation onto the entire touch pad 15a. According to such control as described above, the operation of displaying a thumbnail image string and the operation of selecting a thumbnail image inside a thumbnail image string can be received by using only the touch pad 15a. Thus, in the case where operations with respect to a whole image being displayed inside the main display region M are received from the buttons 15b, the conflicts of the operations with respect to the whole image with operations with respect to the moving images of interest can be prevented.

Figure 7:
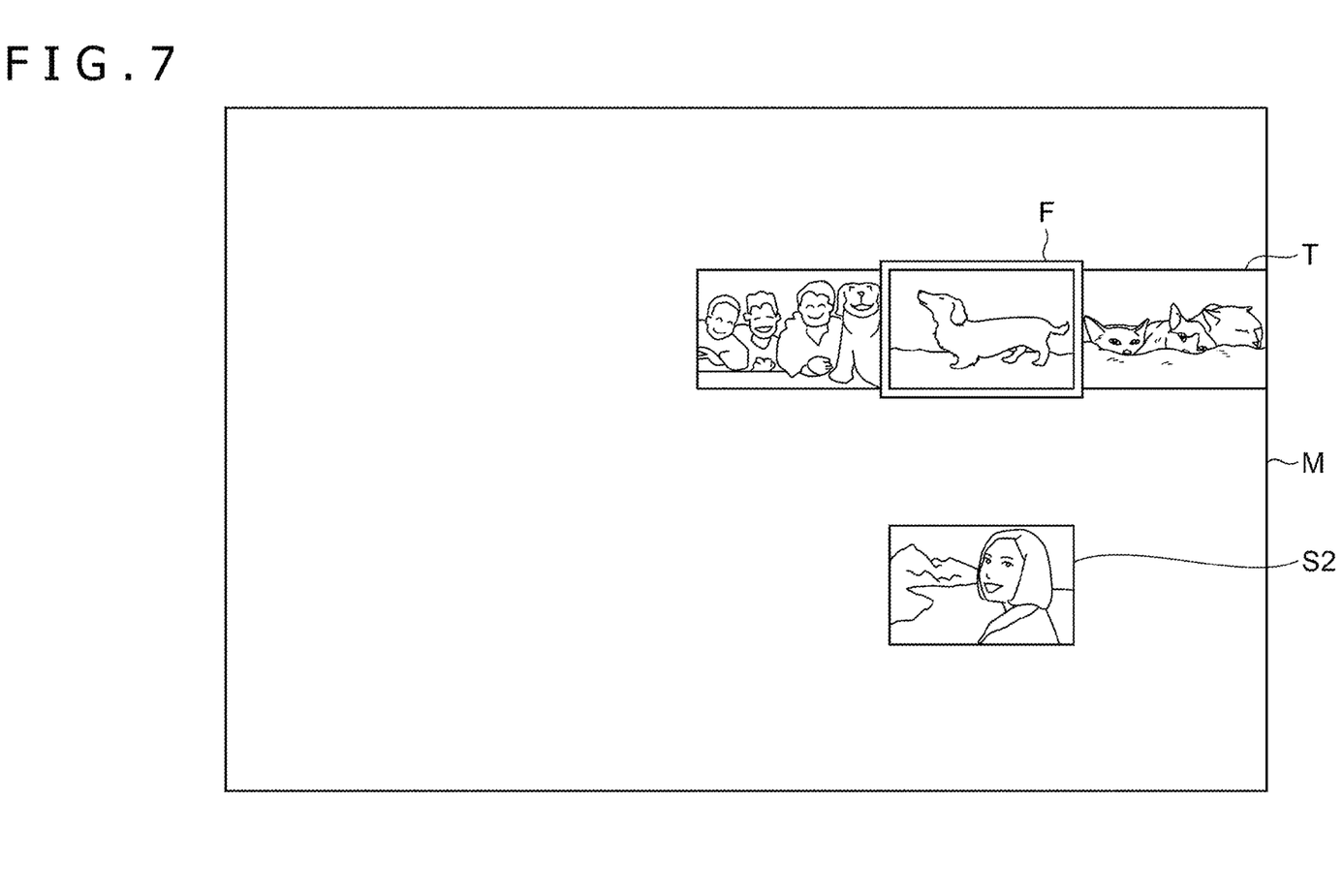
FIG. 7 is a diagram illustrating an example in which a thumbnail image string is displayed inside a region overlaid on a subdisplay region.

Next, as a second example of the display control of the thumbnail image string, an example in which a thumbnail image string is displayed inside a thumbnail display region T overlaid on a subdisplay region S will be described. FIG. 7 illustrates a display example in this case. In FIG. 7, an assumption is made that, in the state illustrated as an example in FIG. 4, like in FIG. 6, an operation of selecting the moving image of interest 1 located at the upper side has been performed. As illustrated in FIG. 7, in the second example, the thumbnail display region T is arranged at a position overlaid on the selected moving image of interest 1. This configuration makes it distinct that a currently displayed thumbnail image string corresponds to the moving image of interest 1. At this time, the subdisplay region S1 in which the moving image of interest 1 has been displayed is hidden by the thumbnail display region T, and the moving image of interest 1 itself is brought into an undisplayed state.

In the example of FIG. 7, the thumbnail display region T is arranged such that its reference position is located at the center position of the thumbnail display region T and is placed on a position overlaid on the subdisplay region S1. In other words, the thumbnail display region T is arranged in such a way as to have a size that allows the thumbnail display region T to be bilaterally-symmetric with respect to the subdisplay region S1 as the center of the symmetry. With this configuration, the position of the subdisplay region S1 in which a moving image of interest has been displayed so far becomes a reference position as it is, and thus, the user can confirm the thumbnail image string with the user's line of sight not greatly moved and remain as it is.

Figure 8:
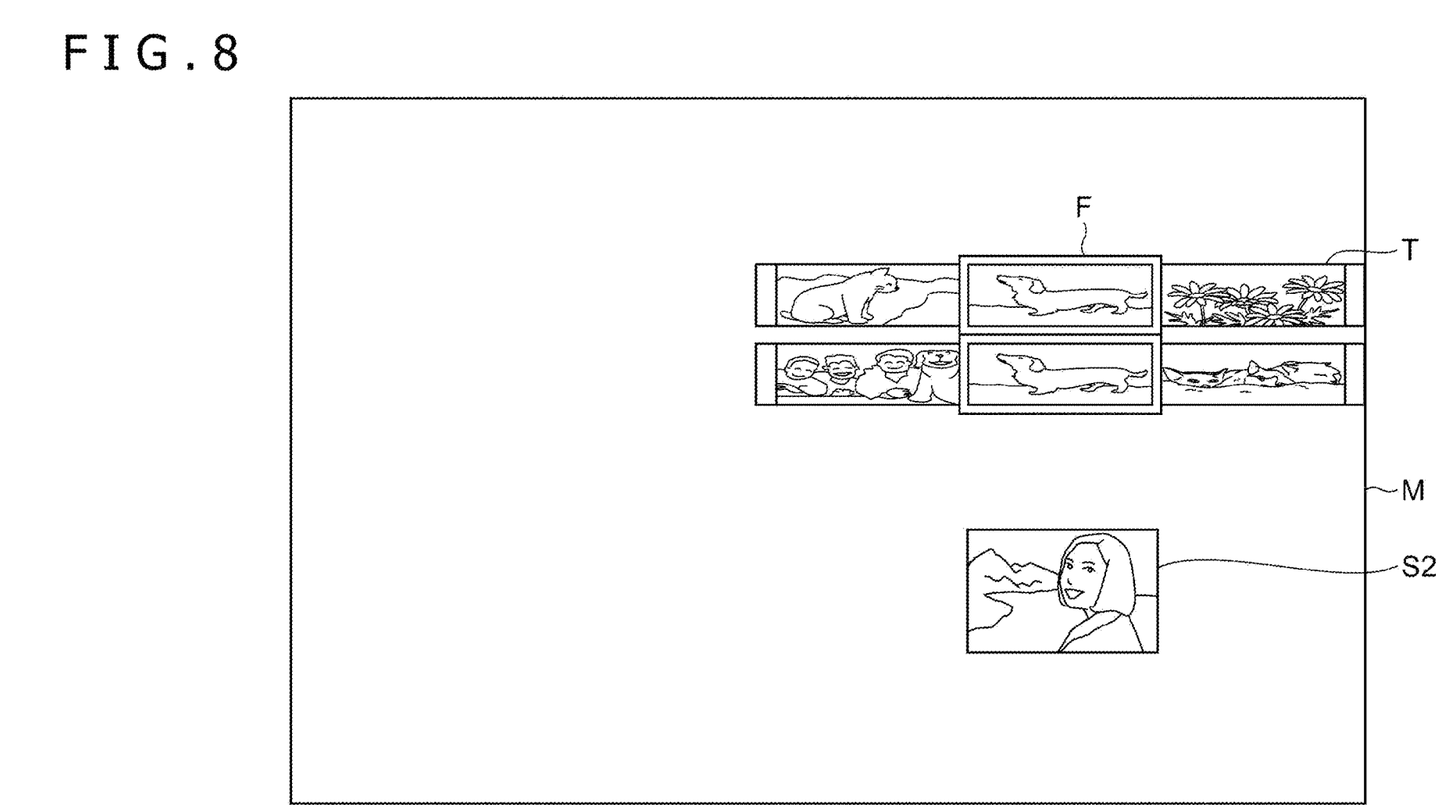
FIG. 8 is a diagram illustrating an example in which, with respect to one moving image of interest, a plurality of thumbnail image strings are displayed.

Moreover, the image string display control section 23 may array and display a plurality of thumbnail image strings having been extracted from one moving image of interest. FIG. 8 illustrates a display example in this case. In the example of FIG. 8, two thumbnail image strings are arrayed and displayed in two upper and lower fields inside the thumbnail display region T overlaid on the subdisplay region S1. The two thumbnail image strings include two kinds of frame images that have been extracted from the same moving image of interest at mutually different time intervals. As an example, an assumption is made that the thumbnail image string in the upper field includes frame images that are displayed at intervals of five minutes when the moving image of interest is reproduced, and the thumbnail image string in the lower field includes frame images that are displayed at intervals of one minute when the moving image of interest is reproduced. In the case where an instruction of scrolling has been received from the user, the image string display control section 23 scrolls the two thumbnail image strings such that they scroll in conjunction with each other. That is, the image string display control section 23 scrolls the both thumbnail image strings such that thumbnail images arrayed and displayed at reference positions in the upper and lower fields correspond to approximately the same reproducing position. Thus, the thumbnail image string reproduced at the shorter time intervals is scrolled in a relatively high speed, and the thumbnail image string reproduced at the longer time intervals is scrolled in a relatively low speed. This configuration makes it possible to confirm the detail of the moving image of interest by using, as needed, the thumbnail image string reproduced at the shorter time intervals, and thus makes it possible to facilitate to confirm the content of the thumbnail image string even when the thumbnail image string is scrolled at a high speed. Here, the image string display control section 23 may be configured to constantly display such two kinds of thumbnail image strings at the same time, or may be configured to display the two kinds of thumbnail image strings only in the case where an operation satisfying a predetermined condition such as an operation of instructing a high-speed scroll has been performed, and display only one of the two kinds of thumbnail image strings until the predetermined condition is satisfied.

In the example of FIG. 7, in the case where the thumbnail image string is displayed at a position located inside the thumbnail display region T and overlaid on the subdisplay region S, the arrangement position of the thumbnail display region T is determined such that a position at which the subdisplay region S has been displayed so far becomes the reference position. In this regard, however, without being limited to this configuration, the image string display control section 23 may shift the reference position from the position at which the subdisplay region S has been displayed so far. Further, in every example in the description so far, the configuration in which the thumbnail images are aligned and arranged in the left-right direction (horizontal direction) in time series inside the thumbnail display region T has been employed. However, the alignment direction of the thumbnail image string is not limited to the above direction, and may be any direction.

Figure 9:
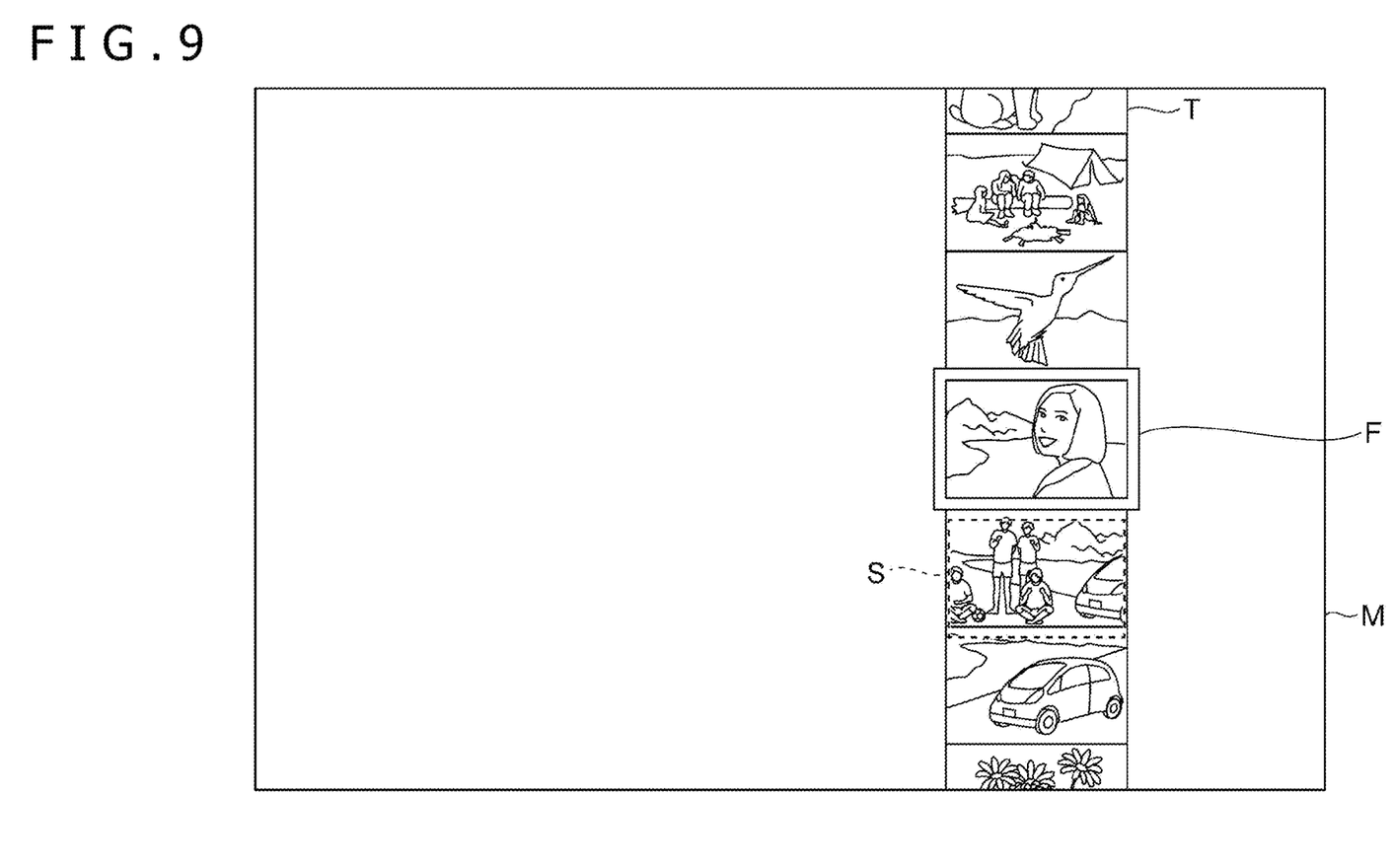
FIG. 9 is a diagram illustrating another example in which a thumbnail image string is displayed inside a region overlaid on a subdisplay region.

FIG. 9 is a diagram illustrating a modification example of such display control of the thumbnail image string. In the example of FIG. 9, an assumption is made that the display of the thumbnail image string has been instructed in a state in which the subdisplay region S illustrated as an example in FIG. 3 is displayed. In this example, unlike the examples described above, the thumbnail images are aligned and arranged in the upper-lower direction (vertical direction).

In the above example, the thumbnail display region T is arranged from the top end to the bottom end of the main display region M, along the upper-lower direction across the entire region. Moreover, the reference position is not set to the position at which the subdisplay region S has been displayed, but is set to the approximately central position of the thumbnail display region T (i.e., the approximately central position of the main display region M). Shifting the reference position from the position of the subdisplay region S in such a way as described above makes it possible to place the reference position on the center of the thumbnail region T simultaneously with lengthening the length of a side that constitutes the thumbnail display region T and that extends along the alignment direction of the thumbnail image string. This configuration makes it possible to display a relatively large number of thumbnail images at once without reducing the size of each of the thumbnail images into a size smaller than the size of the moving image of interest having been originally displayed. In addition, displaying a frame image to be arranged at the reference position in a form identifiable from any other frame image by means of a method of displaying the frame line image F such as that illustrated as an example in FIG. 9 or any other similar method makes it possible to notify the user of at which position the reference position is located, even though the reference position is shifted from the subdisplay region S.

Note that feature items in the examples described above may be mutually combined and applied. For example, a configuration in which two or more kinds of thumbnail image strings are arrayed and displayed inside the thumbnail display region T of the first example may be employed. Further, a configuration in which the scroll and the selection of a thumbnail image are also performed with respect to the thumbnail image string of the second example by means of operations similar to those of the first example may be employed.

According to the information processing device 1 pertaining to the present embodiment described above, in the case where a moving image of interest is displayed in the subdisplay region S so as to be overlayed on the whole image, displaying a thumbnail image string for receiving an instruction of changing the reproducing position of the moving image of interest, at a position determined according to the position of the subdisplay region S makes it possible to display the thumbnail image string in a form unlikely to interfere with the browsing of the whole image.

It should be noted that an embodiment of the present invention are not limited to the above-described embodiment. The arrangement positions of the subdisplay region S and the thumbnail display region T and the content of the operations by a user in the above description are just examples, and may be any other arrangement positions and content. For example, in the above description, the configuration in which the arrangement position of the thumbnail display region T is placed at a position adjacent to or a position overlaid on the subdisplay region S has been employed, but without being limited to this configuration, the position may be a spaced position within a predetermined distance. Further, the arrangement position of the thumbnail display region T may be selected from among a plurality of predetermined candidate positions. In this case, the image string display control section 23 selects the position of the thumbnail display region T from among a plurality of candidate positions, according to a position at which a moving image of interest corresponding to a thumbnail image string desired to be displayed is being displayed. This configuration makes it possible to display the thumbnail image string at a position that corresponds to the moving image of interest and that is unlikely to interfere with the browsing of the whole image.

REFERENCE SIGNS LIST

1: Information processing device
11: Control unit
12: Storage unit
13: Interface unit
14: Display unit
15: Operation device
21: Whole image display control section
22: Moving image display control section
23: Image string display control section

The invention claimed is:

1. An information processing device comprising:
circuitry configured to
while displaying an image, display a moving image of interest different from the image in a predetermined region inside a display region in which the image is being displayed; and
in response to an instruction by a user, array and display, inside the display region, a first image string comprising a first plurality of user selectable frame images extracted from the moving image of interest at a first predetermined time interval arrayed only along a single direction,
wherein the first image string is displayed at a first position determined according to the predetermined region inside the display region, and
wherein the first image string overlays and fully hides the moving image of interest and extends beyond the moving image of interest.

2. The information processing device according to claim 1, wherein the circuitry is configured to display the first image string inside a region adjacent to the predetermined region.

3. The information processing device according to claim 2, wherein the circuitry is configured to display the first image string inside a region adjacent to an outer peripheral side of the display region as viewed from the predetermined region.

4. The information processing device according to claim 1,
wherein the circuitry is configured to
display each of a plurality of mutually different moving images of interest at a same time in a predetermined region among mutually spaced predetermined regions inside the display region, and
display an image string corresponding to each of the plurality of moving images of interest at a position determined according to the predetermined region in which each of the moving images of interest is displayed.

5. The information processing device according to claim 1,
wherein the circuitry is configured to
array and display a second image string adjacent to the first image string,
wherein the second image string comprises a second plurality of frame image extracted from the moving image of interest at a second predetermined time interval different than the first predetermined time interval,
wherein the first and second image strings together fully hide the moving image of interest, and
wherein the first predetermined time interval is greater than the second predetermined time interval.

6. The information processing device according to claim 1, wherein when a scrolling instruction is received from the user while the first image string and a second image string adjacent the first image string are displayed, the first image string and the second image string are scrolled in conjunction at reference positions corresponding to a closest reproducing position in the moving image, and wherein the first and second image strings together fully hide the moving image of interest.

7. The information processing device according to claim 1, wherein the circuitry is further configured to display a frame line image surrounding a frame at a reference position in the first image string.

8. The information processing device according to claim 1, wherein the single direction is a vertical direction.

9. The information processing device according to claim 1, wherein sides of a subdisplay region displaying the image are smaller than or equal to half of a corresponding one of the sides of the display region.

10. An information processing method comprising:
while an image is being displayed, displaying a moving image of interest different from the image in a predetermined region inside a display region in which the image is being displayed; and
in response to an instruction by a user, arraying and displaying, inside the display region, an image string comprising a plurality of user selectable frame images extracted from the moving image of interest at a predetermined time interval only along a single direction,
wherein the image string is displayed at a position determined according to the predetermined region inside the display region, and
wherein the image string overlays and fully hides the moving image of interest and extends beyond the moving image of interest while the image string is displayed.

11. The information processing method according to claim 10, further comprising displaying the moving image inside a region adjacent to the predetermined region.

12. The information processing method according to claim 10, further comprising displaying the moving image inside a region adjacent to an outer peripheral side of the display region as viewed from the predetermined region.

13. The information processing method according to claim 10, further comprising:
displaying each of a plurality of mutually different moving images of interest at a same time in a predetermined region among mutually spaced predetermined regions inside the display region, and
displaying an image string corresponding to each of the plurality of moving images of interest at a position determined according to the predetermined region in which each of the moving images of interest is displayed.

14. The information processing method according to claim 10, wherein the moving image constitutes a first image string, the method further comprising arraying and displaying a second image string adjacent to the first image string,
wherein the second image string includes a second plurality of frame image extracted from the moving image of interest at a second predetermined time interval different than the first predetermined time interval,
wherein the first and second image strings together fully hide the moving image of interest, and
wherein the first predetermined time interval is greater than the second predetermined time interval.

15. The information processing method according to claim 10,
wherein: the moving image constitutes a first image string,
when a scrolling instruction is received from the user while the first image string and a second image string adjacent the first image string are displayed, scrolling the first image string and the second image string in conjunction at reference positions corresponding to a closest reproducing position in the moving image, and
the first and second image strings together fully hide the moving image of interest.

16. The information processing method according to claim 10, further comprising displaying a frame line image surrounding a frame at a reference position in the moving image.

17. The information processing method according to claim 10, wherein the single direction is a vertical direction.

18. The information processing method according to claim 10, wherein sides of a subdisplay region displaying the image are smaller than or equal to half of a corresponding one of the sides of the display region.

19. A non-transitory computer readable medium having stored thereon a program, which, when executed by a processor, causes the processor to:
while an image is being displayed, displaying a moving image of interest different from the image in a predetermined region inside a display region in which the image is being displayed; and
in response to an instruction by a user, array and displaying, inside the display region, an image string comprising a plurality of user selectable frame images extracted from the moving image of interest at a predetermined time interval only along a single direction,
wherein the image string is displayed at a position determined according to the predetermined region inside the display region, and
wherein the image string overlays and fully hides the moving image of interest and extends beyond the moving image of interest while the image string is displayed.

20. The non-transitory computer readable medium according to claim 19, wherein the moving image constitutes a first image string, the program further causing the processor to array and display a second image string adjacent to the first image string,
wherein the second image string includes a second plurality of frame image extracted from the moving image of interest at a second predetermined time interval different than the first predetermined time interval, wherein the first and second image strings together fully hide the moving image of interest, and wherein the first predetermined time interval is greater than the second predetermined time interval.

\* \* \* \* \*